US012564845B2

(12) United States Patent
Terada et al.

(10) Patent No.: US 12,564,845 B2
(45) Date of Patent: Mar. 3, 2026

(54) PURIFICATION APPARATUS

(71) Applicant: SHIMADZU CORPORATION, Kyoto (JP)

(72) Inventors: Masaaki Terada, Kyoto (JP); Masaki Kaneda, Kyoto (JP); Toshihisa Itabashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 18/720,633

(22) PCT Filed: Oct. 28, 2022

(86) PCT No.: PCT/JP2022/040296
§ 371 (c)(1),
(2) Date: Jun. 15, 2024

(87) PCT Pub. No.: WO2023/127274
PCT Pub. Date: Jul. 6, 2023

(65) Prior Publication Data

US 2025/0050351 A1 Feb. 13, 2025

(30) Foreign Application Priority Data

Dec. 28, 2021 (JP) ................................ 2021-214078

(51) Int. Cl.
*B03B 5/36* (2006.01)

(52) U.S. Cl.
CPC ..................................... *B03B 5/36* (2013.01)

(58) Field of Classification Search
CPC ....................................................... B03B 5/36

(Continued)

(56) References Cited

U.S. PATENT DOCUMENTS 3,490,589 A * 1/1970 Cymbalisty ........ B01D 21/2427 209/163
4,163,723 A * 8/1979 Romano .................. B03B 5/36 209/159

(Continued)

FOREIGN PATENT DOCUMENTS

CN 112485093 A 3/2021
JP H037346 U 1/1991

(Continued)

OTHER PUBLICATIONS

Imhof, Hannes K. et al., "A novel, highly efficient method for the separation and quantification of plastic particles in sediments of aquatic environments," Limnology and Oceanography: Methods, vol. 10, Issue 7, Jul. 17, 2012, pp. 524-537.

(Continued)

*Primary Examiner* — Terrell H Matthews
(74) *Attorney, Agent, or Firm* — Renner, Otto, Boisselle & Sklar, LLP

(57) ABSTRACT

A purification apparatus separates a target substance contained in a mixed sample based on a specific gravity difference. The purification apparatus includes a container that receives the mixed sample and a strainer arranged in the container. The container includes an introduction port to introduce a treatment solution for treatment of the mixed sample into the container and a discharge port to discharge the treatment solution from the container. The strainer is configured to catch the target substance in the treatment solution discharged through the discharge port and to hold the target substance in the container.

9 Claims, 5 Drawing Sheets

(58) Field of Classification Search
USPC .......................................................... 209/172
See application file for complete search history.

(56) References Cited

U.S. PATENT DOCUMENTS

| | | | | | |
|---|---|---|---|---|---|
| 5,593,587 | A | | 1/1997 | Fumihiko | |
| 8,826,806 | B2 | * | 9/2014 | Difante | A47J 27/18 99/410 |
| 2002/0033550 | A1 | | 3/2002 | Suehara | |
| 2020/0383514 | A1 | * | 12/2020 | Kaptelinin | A47J 31/0636 |

FOREIGN PATENT DOCUMENTS

| | | | | | |
|---|---|---|---|---|---|
| JP | H04036768 | Y2 | | 8/1992 | |
| JP | 2000257148 | A | | 9/2000 | |
| JP | 2002-192138 | A | | 7/2002 | |
| JP | 2003-024924 | A | | 1/2003 | |
| JP | 2023058102 | A | * | 4/2023 | B65D 81/3222 |
| WO | WO-2022240278 | A1 | * | 11/2022 | B26D 3/00 |
| WO | WO-2023119844 | A1 | * | 6/2023 | B01L 3/502753 |
| WO | WO-2023127274 | A1 | * | 7/2023 | B03B 5/30 |

OTHER PUBLICATIONS

GESAMP (2019). “Guidelines for the Monitoring and Assessment of Plastic Litter and Microplastics in the Ocean”, (Kershaw P.J., Turra A. and Galgani F. editors), (IMO/FAO/UNESCOIOC/UNIDO/WMO/IAEA/UN/UNEP/UNDP/ISA Joint Group of Experts on the Scientific Aspects of Marine Environmental Protection). Rep. Stud. GESAMP No. 99, 130p.
Written Opinion for corresponding Application No. PCT/JP2022/040296, mailed Dec. 13, 2022.
Extended European Search Report received for European Patent Application No. 22915507.2, mailed on Oct. 10, 2025, 9 pages.
Office Action received for Japanese Patent Application No. 2023-570687, mailed on Sep. 16, 2025, 6 pages (3 pages of English Translation and 3 pages of Official Copy).
Office Action for corresponding Japanese Application No. 2023-570687 mailed Mar. 11, 2025 with English translation.

* cited by examiner

PURIFICATION APPARATUS

TECHNICAL FIELD

The present disclosure relates to a purification apparatus and more particularly to a strainer arranged in the purification apparatus.

BACKGROUND ART

In order to collect a target substance which is a component to be collected, a mixed sample containing the target substance is purified. NPL 1 discloses a purification instrument that collects microplastic contained in a mixed sample collected from the sea, based on gravity separation of the mixed sample with the use of a heavy solution.

CITATION LIST

Non Patent Literature

NPL 1: Hannes K. Imhof et al., "A novel, highly efficient method for the separation and quantification of plastic particles in sediments of aquatic environments," LIMNOLOGY and OCEANOGRAPHY: METHODS, Volume 10, Issue 7, pp. 524-537, 17 Jul. 2012, https://doi.org/10.4319/lom.2012.10.524

SUMMARY OF INVENTION

Technical Problem

In the purification instrument described above, prior to gravity separation with the use of the heavy solution, a decomposition solution (an oxidizing agent) for decomposition treatment of a contaminant contained in the mixed sample and a cleaning solution (a rinse agent) for cleaning of the mixed sample subjected to the decomposition treatment should be introduced into and discharged from a container in the purification instrument. In discharge of a waste solution resulting from these treatments, there is a concern about leakage of microplastic to be collected, together with the treatment solution.

The present disclosure was made to solve such a problem as described above, and an object thereof is to prevent in a purification apparatus, leakage of a target substance to be collected in discharge of a waste solution from a container.

Solution to Problem

A purification apparatus according to the present disclosure separates a target substance contained in a mixed sample based on a specific gravity difference. The purification apparatus includes a container that receives the mixed sample and a strainer arranged in the container. The container includes an introduction port to introduce a treatment solution for treatment of the mixed sample into the container and a discharge port to discharge the treatment solution from the container. The strainer is configured to catch the target substance in the treatment solution discharged through the discharge port and to hold the target substance in the container.

Advantageous Effects of Invention

Since the strainer is arranged in the container in the purification apparatus according to the present disclosure, in discharge of the waste solution from the container through the discharge port, the target substance is held in the container and leakage of the target substance to the outside of the container is prevented.

DESCRIPTION OF EMBODIMENTS

Figure 1:
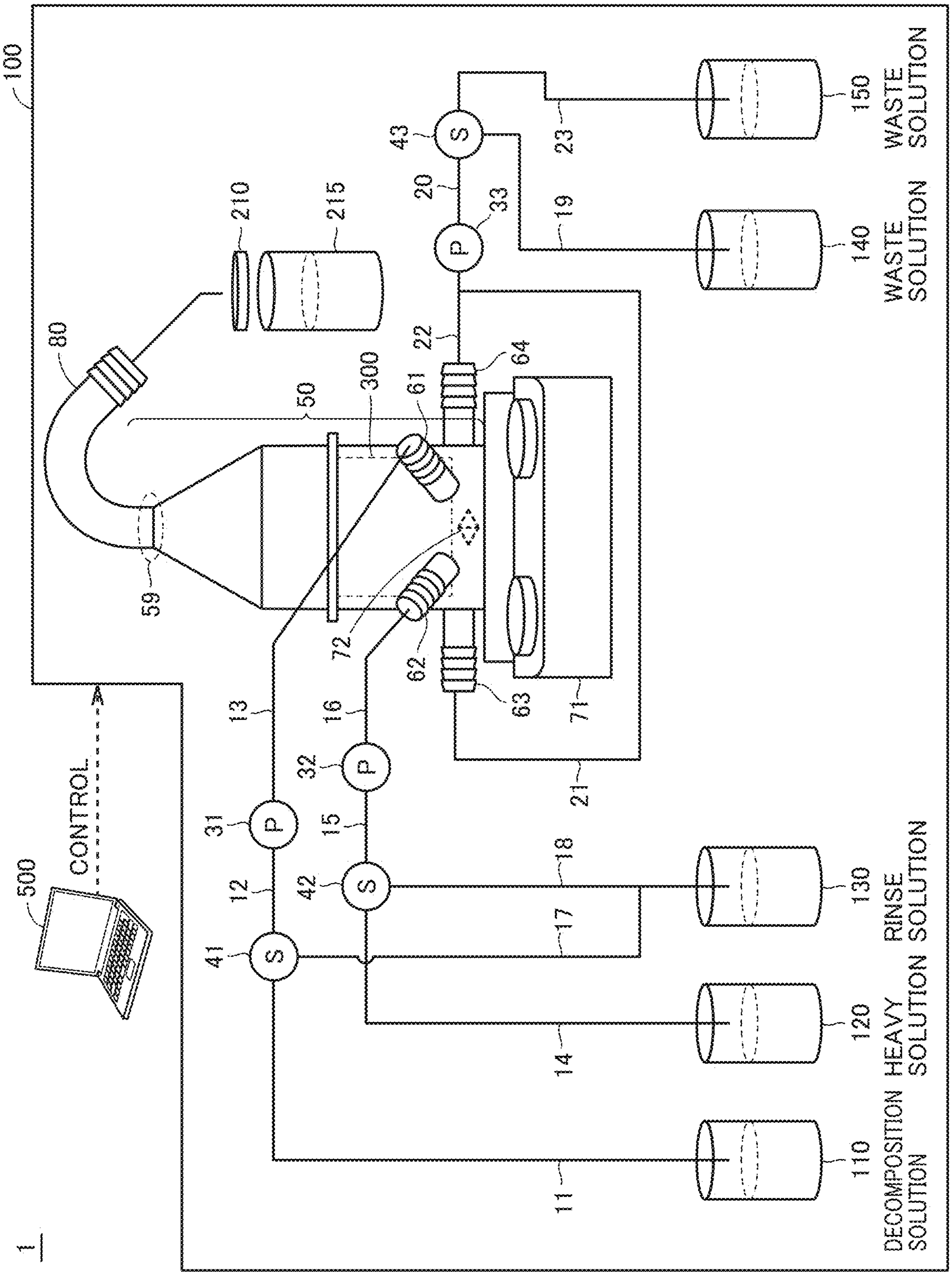
FIG. 1 is a diagram schematically showing a purification apparatus according to an embodiment.

An embodiment of the present disclosure will be described in detail below with reference to the drawings. The same or corresponding elements in the drawings have the same reference characters allotted and description thereof will not be repeated.

[Configuration of Purification Apparatus]

A main configuration of a purification apparatus 1 according to an embodiment will be described with reference to FIG. 1. FIG. 1 is a diagram schematically showing purification apparatus 1 according to the embodiment. As shown in FIG. 1, purification apparatus 1 includes a purification instrument 100 that purifies a mixed sample and a controller 500 that controls purification instrument 100. Purification apparatus 1 according to the embodiment purifies the mixed sample under the control of purification instrument 100 by controller 500 to collect a component (target substance) to be collected that is contained in the mixed sample. "Purification" encompasses taking a target substance out of a mixture with the use of a treatment solution. In purification apparatus 1 according to the embodiment, a "decomposition solution," a "heavy solution," and a "rinse solution (cleaning solution)" are used as the "treatment solution."

A "mixed sample" to be purified by purification apparatus 1 may be in any form so long as it contains a target substance. Exemplary "mixed samples" include seawater and sand collected from the sea or the seashore, and processed products such as food and cosmetics. In the embodiment, seawater and sand collected from the sea or the seashore represent an exemplary "mixed sample." The "mixed sample" is also simply referred to as a "sample" below.

Any component to be collected by purification apparatus 1 may be applicable as the "target substance" to be collected by purification apparatus 1. Exemplary "target substances" include microplastic which is fine plastic particles having a size not larger than 5 mm. In the embodiment, microplastic contained in seawater and sand collected from the sea or the seashore represents an exemplary "target substance".

Purification instrument 100 includes a container 50 where a sample is accommodated, pipes 11 to 23, pumps 31 to 33, electromagnetic valves 41 to 43, ports 61 to 64, a stirrer 71, a stirring bar 72, an overflow portion 80, a decomposition solution reservoir 110, a heavy solution reservoir 120, a rinse solution reservoir 130, waste solution reservoirs 140 and 150, a detection filter 210, and a supernatant reservoir 215.

Pipe 11 connects decomposition solution reservoir 110 and electromagnetic valve 41 to each other. Pipe 12 connects electromagnetic valve 41 and pump 31 to each other. Pipe 13 connects pump 31 and port 61 provided in an outer circumferential portion of container 50 to each other. Decomposition solution reservoir 110 and port 61 of container 50 are thus connected to each other through pipes 11, 12, and 13 with electromagnetic valve 41 and pump 31 being interposed.

Pipe 14 connects heavy solution reservoir 120 and electromagnetic valve 42 to each other. Pipe 15 connects electromagnetic valve 42 and pump 32 to each other. Pipe 16 connects pump 32 and port 62 provided in the outer circumferential portion of container 50 to each other. Heavy solution reservoir 120 and port 62 of container 50 are thus connected to each other through pipes 14, 15, and 16 with electromagnetic valve 42 and pump 32 being interposed.

Pipe 17 connects rinse solution reservoir 130 and electromagnetic valve 41 to each other. In other words, while electromagnetic valve 41 is connected to decomposition solution reservoir 110 through pipe 11, it is connected also to rinse solution reservoir 130 through pipe 17. Rinse solution reservoir 130 and port 61 of container 50 are thus connected to each other through pipes 17, 12, and 13 with electromagnetic valve 41 and pump 31 being interposed.

Pipe 18 connects rinse solution reservoir 130 and electromagnetic valve 42 to each other. In other words, while electromagnetic valve 42 is connected to heavy solution reservoir 120 through pipe 14, it is connected also to rinse solution reservoir 130 through pipe 18. Rinse solution reservoir 130 and port 62 of container 50 are thus connected to each other through pipes 18, 15, and 16 with electromagnetic valve 42 and pump 32 being interposed.

Pipe 19 connects waste solution reservoir 140 and electromagnetic valve 43 to each other. Pipe 20 connects electromagnetic valve 43 and pump 33 to each other. Pipe 21 connects pump 33 and port 63 provided in the outer circumferential portion of container 50 to each other. Waste solution reservoir 140 and port 63 of container 50 are thus connected to each other through pipes 19, 20, and 21 with electromagnetic valve 43 and pump 33 being interposed.

Pipe 22 connects pump 33 and port 64 provided in the outer circumferential portion of container 50 to each other. In other words, while pump 33 is connected to port 63 of container 50 through pipe 21, it is connected also to port 64 of container 50 through pipe 22. Waste solution reservoir 140 and port 64 of container 50 are thus connected to each other through pipes 19, 20, and 22 with electromagnetic valve 43 and pump 33 being interposed.

A pipe 23 connects waste solution reservoir 150 and electromagnetic valve 43 to each other. In other words, while electromagnetic valve 43 is connected to waste solution reservoir 140 through pipe 19, it is connected also to waste solution reservoir 150 through pipe 23. Waste solution reservoir 150 and port 63 of container 50 are thus connected to each other through pipes 23, 20, and 21 with electromagnetic valve 43 and pump 33 being interposed. Waste solution reservoir 150 and port 64 of container 50 are connected to each other through pipes 23, 20, and 22 with electromagnetic valve 43 and pump 33 being interposed.

A decomposition solution for treatment of a contaminant is stored in decomposition solution reservoir 110. The "contaminant" refers to a foreign matter in the mixed sample, other than a target substance. In the embodiment, an exemplary "contaminant" includes an organic contaminant having a property of an organic substance. Any other solution may be applicable as the "decomposition solution" so long as the contaminant is decomposed therewith. In the embodiment, the "decomposition solution" decomposes an organic contaminant. The "decomposition solution" is, for example, an oxidizing agent such as oxygenated water ($H_2O_2$) and a mixture of oxygenated water ($H_2O_2$) and iron (II) oxide (FeO). When seawater and sand are adopted as the "mixed sample," "organic contaminants" are, for example, a scrap piece of wood and planktons that are mixed in seawater or sand.

A heavy solution for separation of a sample based on a specific gravity difference is stored in heavy solution reservoir 120. Any other solution may be applicable as the "heavy solution" so long as it separates the sample based on the specific gravity difference. In the embodiment, the "heavy solution" allows an inorganic contaminant having a property of an inorganic substance to settle based on the specific gravity difference. For example, "heavy solutions" include sodium chloride (NaCl), sodium iodide (NaI), and zinc chloride ($ZnCl_2$). When seawater and sand are adopted as the "mixed sample," "inorganic contaminants" are sand, glass, and stone. A specific gravity of the "heavy solution" is set to be greater than a specific gravity of the "target substance" to be collected by purification apparatus 1 and to be smaller than a specific gravity of the "inorganic contaminant." For example, when microplastic is adopted as the "target substance" to be collected by purification apparatus 1 and sand, glass, stone, and the like are adopted as the "inorganic contaminant," the "heavy solution" is set to be greater in specific gravity than microplastic and to be smaller in specific gravity than sand, glass, stone, and the like. Specifically, the specific gravity of the "heavy solution" is set approximately to 1.5 to 1.7.

A rinse solution which is a cleaning solution for cleaning of the inside of container 50 is stored in rinse solution reservoir 130. Any other solution may be applicable as the "rinse solution" so long as the inside of container 50 is cleaned therewith. An exemplary "rinse solution" is water. The "rinse solution" plays a role to clean the inside of container 50 and a role to dilute the decomposition solution introduced into container 50.

A waste solution discharged from container 50 such as the heavy solution, the decomposition solution, the rinse solution, and sea water contained in the mixed sample is stored in waste solution reservoirs 140 and 150.

"Decomposition solution reservoir 110," "heavy solution reservoir 120," and "rinse solution reservoir 130" in the present embodiment correspond to the "first reservoir," the "second reservoir," and the "third reservoir" in the present disclosure, respectively.

Pump 31 introduces the decomposition solution in decomposition solution reservoir 110 or the rinse solution in rinse solution reservoir 130 into container 50 through port 61 under the control by controller 500.

Pump 32 introduces the heavy solution in heavy solution reservoir 120 or the rinse solution in rinse solution reservoir 130 into container 50 through port 62 under the control by controller 500. Pumps 31 and 32 are also referred to as "introduction pumps 31 and 32" below.

Pump 33 discharges the waste solution in container 50 through port 63 or port 64 to waste solution reservoir 140 or waste solution reservoir 150 under the control by controller 500. Pump 33 is also referred to as a "discharge pump 33" below.

Electromagnetic valve 41 switches a path to be connected to port 61 of container 50 between decomposition solution reservoir 110 and rinse solution reservoir 130 under the control by controller 500.

Electromagnetic valve 42 switches a path to be connected to port 62 of container 50 between heavy solution reservoir 120 and rinse solution reservoir 130 under the control by controller 500.

Electromagnetic valve 43 switches a path to be connected to ports 63 and 64 of container 50 between waste solution reservoir 140 and waste solution reservoir 150 under the control by controller 500. For example, the waste solution containing the heavy solution is discharged to waste solution reservoir 140 and the waste solution containing the decomposition solution is discharged to waste solution reservoir 150.

The decomposition solution from decomposition solution reservoir 110 or the rinse solution from rinse solution reservoir 130 delivered by pump 31 is introduced into container 50 through port 61. The heavy solution from heavy solution reservoir 120 or the rinse solution from rinse solution reservoir 130 delivered by pump 32 is introduced into container 50 through port 62. As pump 33 is driven, the waste solution in container 50 is discharged to waste solution reservoir 140 or waste solution reservoir 150 through ports 63 and 64. In the description below, ports 61 and 62 are also referred to as "introduction ports 61 and 62" and ports 63 and 64 are also referred to as "discharge ports 63 and 64."

A strainer 300, provided in the inside of container 50, prevents the target substance contained in the sample from being discharged from container 50. Strainer 300 has a mesh size small enough to trap microplastic which is the target substance. For example, strainer 300 is a wire gauze made of steel use stainless (SUS). Strainer 300 will be described in detail with reference to FIGS. 4 and 5.

Stirrer 71 is, for example, a constant-temperature stirrer, and arranged below container 50. Stirrer 71 rotates stirring bar 72 provided in container 50 under the control by controller 500 to stir the sample in container 50. Furthermore, stirrer 71 keeps a temperature of the sample in container 50 constant by heating container 50 from below container 50.

Overflow portion 80 is connected to a discharge outlet 59 provided at an uppermost portion of container 50, and a supernatant of the sample containing the target substance flows over container 50 and is discharged therethrough to the outside.

Detection filter 210 collects the target substance contained in the supernatant of the sample that flows over overflow portion 80 by filtering the supernatant. The supernatant that has passed through detection filter 210 is collected in supernatant reservoir 215. Detection filter 210 has a mesh size small enough to trap microplastic which is a target component. Detection filter 210 is, for example, a wire gauze made of SUS or a membrane filter made of polytetrafluoroethylene (PTFE) (Teflon™) When microplastic is adopted as the target component, the mesh size of detection filter 210 should be small enough not to allow passage therethrough of a particle having a size of 0.1 to 5.0 mm, and the mesh size is preferably approximately 0.1 mm.

Controller 500 may be implemented by a general-purpose computer or a dedicated computer for controlling purification instrument 100. Controller 500 controls pumps 31 to 33, electromagnetic valves 41 to 43, and stirrer 71 in purification instrument 100. Controller 500 corresponds to one example of a "computer" in the present disclosure.

[Hardware Configuration]

Figure 2:
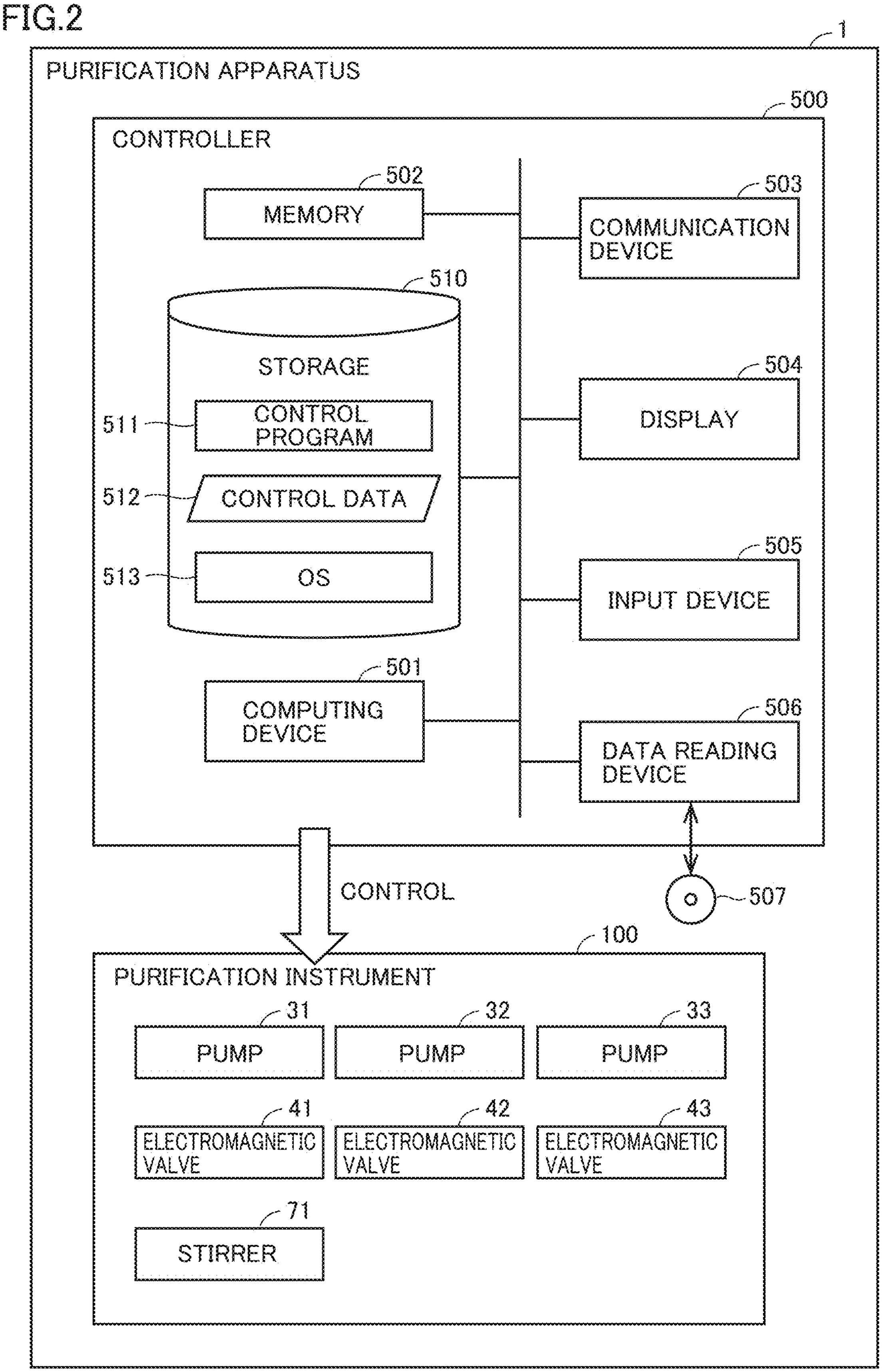
FIG. 2 is a diagram for illustrating a hardware configuration of the purification apparatus.

A hardware configuration of purification apparatus 1 according to the embodiment will be described with reference to FIG. 2. FIG. 2 is a diagram for illustrating a hardware configuration of purification apparatus 1 according to the embodiment. As shown in FIG. 2, controller 500 includes, as main hardware elements thereof, a computing device 501, a memory 502, a communication device 503, a display 504, an input device 505, a data reading device 506, and a storage 510.

Computing device 501 is a computer that reads a program (for example, a control program 511 and an operating system (OS) 513) stored in storage 510 and develops the read program on memory 502 to execute the same. For example, computing device 501 performs purification processing (which will be described later with reference to FIG. 3) for controlling purification instrument 100 by executing control program 511. Computing device 501 is implemented, for example, by a central processing unit (CPU), a field programmable gate array (FPGA), a graphics processing unit (GPU), a multi processing unit (MPU), or the like. Computing device 501 may be implemented by processing circuitry.

Memory 502 provides a storage area where a program code or a work memory is temporarily stored in execution of any program by computing device 501. Memory 502 is implemented by a volatile memory such as a dynamic random access memory (DRAM) or a static random access memory (SRAM), or a non-volatile memory such as a read only memory (ROM) or a flash memory.

Communication device 503 transmits and receives data to and from another device over a network (not shown). Communication device 503 is in conformity with any communication scheme such as Ethernet®, wireless local area network (LAN), and Bluetooth®.

Display 504 is implemented, for example, by a liquid crystal display (LCD), and shows a program design screen or an alert screen on the occurrence of an abnormal condition.

Input device 505 is implemented, for example, by a keyboard, a mouse, or the like, and used for input of design information by a user in design of a program. Input device 505 may include a start switch for starting purification processing by computing device 501.

Data reading device 506 reads data stored in a storage medium 507. Any other feature such as a compact disc (CD), a digital versatile disc (DVD), or a universal serial bus (USB) memory may be applicable as storage medium 507 so long as various types of data can be stored therein.

Storage 510 provides a storage area where various types of data required for purification processing or the like are stored. Storage 510 is implemented, for example, by a non-volatile memory device such as a hard disk drive (HDD) or a solid state drive (SSD). Control program 511, control data 512, and OS 513 are stored in storage 510.

Control program 511 is a program in which contents of purification processing are described, and executed by computing device 501. Control program 511 may be designed by a user with the use of input device 505, read from storage medium 507 by data reading device 506, or obtained through the network from another device such as a server by communication device 503.

Control data 512 is data used in execution of control program 511 by computing device 501. For example, control data 512 includes data such as a setting value for control of each of pumps 31 to 33, electromagnetic valves 41 to 43, and stirrer 71. Control data 512 may be inputted by a user with the use of input device 505, read from storage medium 507 by data reading device 506, or obtained through the network from another device such as a server by communication device 503.

OS 513 provides a basic function for computing device 501 to perform various types of processing.

[Sample Purification Processing]

Figure 3:
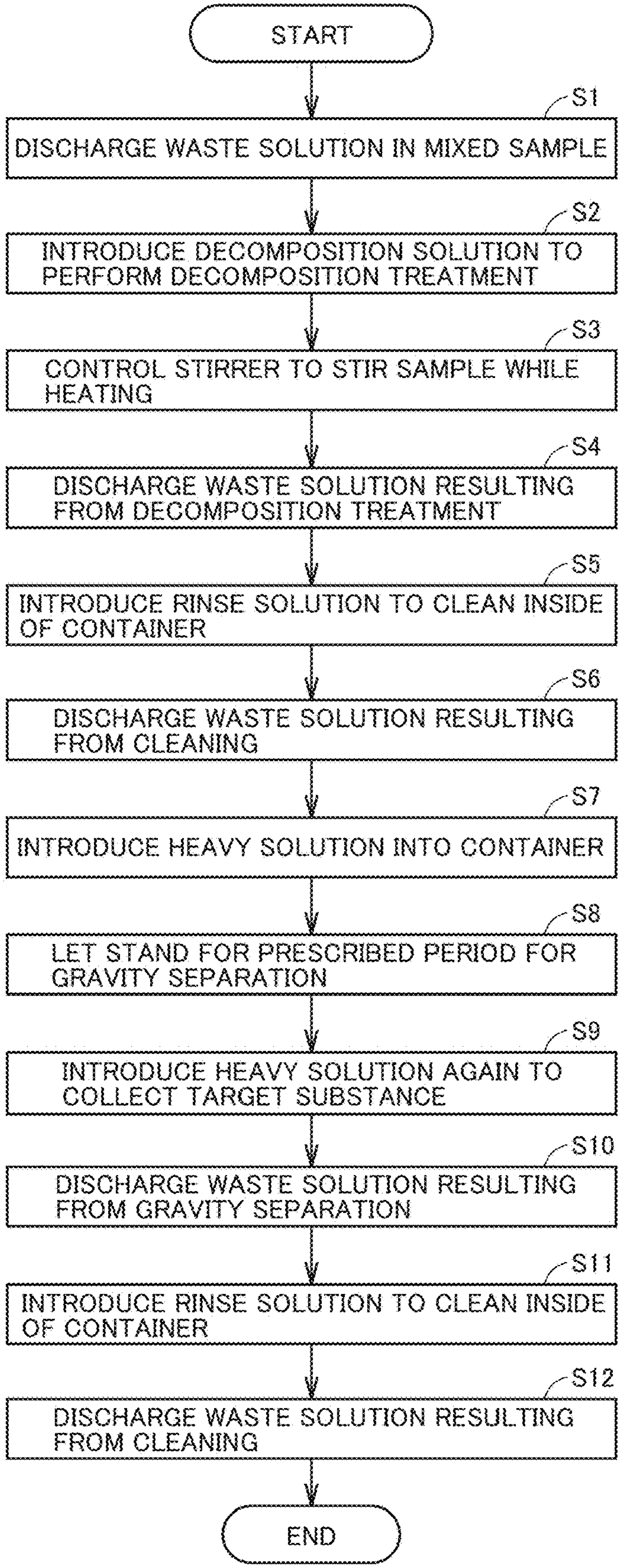
FIG. 3 is a flowchart of purification processing performed by the purification apparatus.

Sample purification processing performed by purification apparatus 1 will now be described with reference to FIG. 3. FIG. 3 is a flowchart of purification processing performed by purification apparatus 1 according to the present embodiment. Each step shown in FIG. 3 is performed by execution of OS 513 and control program 511 by computing device 501 of controller 500.

For preparation, a user introduces a sample into container 50 of purification apparatus 1. As will be described later with reference to FIG. 4, container 50 can be separated into two portions (a first portion 51 and a second portion 55). The user removes first portion 51 from second portion 55 to open container 50 to introduce the sample into container 50. Thereafter, the user performs a start operation with the use of input device 505 of controller 500 to start control of purification instrument 100 by controller 500.

When controller 500 starts control of purification instrument 100, in step S1, controller 500 controls pump 33 and electromagnetic valve 43 to discharge a liquid component of the sample introduced in container 50 to waste solution reservoir 150 through pipes 20 to 23 and ports 63 and 64. Microplastic or the like which is a substance to be collected and contained in the sample is caught by strainer 300 provided in the inside of container 50 and held in container 50.

In step S2, controller 500 then deactivates pump 33 on a discharge side and controls pump 31 and electromagnetic valve 41 to introduce the decomposition solution in decomposition solution reservoir 110 into container 50 through pipes 11 to 13 and port 61.

In step S3, controller 500 then controls stirrer 71 to rotate stirring bar 72 provided in container 50 to stir the sample while certain heat is applied to container 50. A temperature of container 50 and a rotation speed and a rotation time period of stirring bar 72 are set in advance by the user. As the sample is thus stirred, oxidation treatment with an oxidizing agent is performed and an organic contaminant contained in the sample is decomposed. Though heating is not necessarily required during stirring of the sample, decomposition by oxidation treatment is accelerated by the temperature of the sample maintained constant by heating.

In step S4, controller 500 then controls pump 33 and electromagnetic valve 43 to discharge the waste solution in container 50 included in the sample in which the organic contaminant has been decomposed to waste solution reservoir 150 through pipes 20 to 23 and ports 63 and 64. Microplastic which is the target substance contained in the sample is caught by strainer 300 provided in the inside of container 50 and held in container 50.

In step S5, controller 500 then deactivates pump 33 on the discharge side and controls pump 31 and electromagnetic valve 41 to introduce the rinse solution in rinse solution reservoir 130 into container 50 through pipes 17, 12, and 13 and port 61 to clean the inside of container 50. At this time, controller 500 controls an amount of suction by pump 31 to introduce the rinse solution in an amount set in advance by the user into container 50.

In step S6, controller 500 then controls pump 33 and electromagnetic valve 43 to discharge the waste solution resulting from cleaning with the rinse solution to waste solution reservoir 150 through pipes 20 to 23 and ports 63 and 64. The inside of container 50 is thus cleaned with the rinse solution. Microplastic to be collected that is contained in the sample is caught by strainer 300 provided in the inside of container 50 and held in container 50. Thereafter, controller 500 may let the sample stand as it is for a prescribed period (for example, for one day) to dry the sample.

In step S7, controller 500 then controls pump 32 and electromagnetic valve 42 to introduce the heavy solution in heavy solution reservoir 120 into container 50 through pipes 14 to 16 and port 62. At this time, controller 500 controls the amount of suction by pump 32 to introduce the heavy solution in an amount set in advance by the user into container 50.

Thereafter, in step S8, controller 500 lets the sample stand as it is for a prescribed period (for example, for one day). As the heavy solution is thus introduced into the sample in container 50 and let stand, an inorganic contaminant contained in the sample settles around the bottom of container 50 owing to the specific gravity difference. Microplastic which is the target substance lighter in specific gravity than the heavy solution, on the other hand, floats over a fluid level of the heavy solution.

In step S9, controller 500 then again controls pump 32 and electromagnetic valve 42 to again introduce the heavy solution in heavy solution reservoir 120 into container 50 through pipes 14 to 16 and port 62. At this time, controller 500 controls the amount of suction by pump 32 to introduce the heavy solution in the amount set in advance by the user into container 50. As the heavy solution is thus introduced again into the sample in container 50, a fluid level of the sample separated based on the specific gravity gradually rises in container 50 and the supernatant of the sample soon reaches discharge outlet 59 of container 50. Then, the supernatant of the sample is discharged to the outside through discharge outlet 59 and overflow portion 80.

The supernatant of the sample discharged through overflow portion 80 is filtered by detection filter 210, and only the waste solution is collected in supernatant reservoir 215. Microplastic which is the component lighter in specific gravity than the heavy solution remains at detection filter 210.

After microplastic is collected as a result of purification of the sample, controller 500 has container 50 cleaned as post-treatment. Specifically, in step S10, controller 500 controls pump 33 and electromagnetic valve 43 to discharge the waste solution in container 50 from which microplastic has been collected to waste solution reservoir 140 through pipes 19 to 22 and ports 63 and 64.

In step S11, controller 500 then deactivates pump 33 on the discharge side and controls pump 32 and electromagnetic valve 42 to introduce the rinse solution in rinse solution reservoir 130 into container 50 through pipes 18, 15, and 16 and port 62 to clean the inside of container 50. At this time, controller 500 controls the amount of suction by pump 32 to introduce the rinse solution in the amount set in advance by the user into container 50.

In step S12, controller 500 then controls pump 33 and electromagnetic valve 43 to discharge the waste solution in container 50 into which the rinse solution has been introduced to waste solution reservoir 140 through pipes 19 to 22 and ports 63 and 64. The inside of container 50 is thus cleaned with the rinse solution.

As set forth above, according to purification apparatus 1 according to the present embodiment, controller 500 automatically has the decomposition solution and the heavy solution introduced into the sample accommodated in container 50 or automatically has the waste solution discharged from container 50, at appropriate timing for an appropriate time period. Therefore, the user himself/herself does not have to introduce the decomposition solution and the heavy solution into container 50 or to discharge the waste solution from container 50. Furthermore, according to purification apparatus 1 according to the present embodiment, after microplastic is collected, controller 500 has used container 50 automatically cleaned. Thus, without depending on skills of the user, microplastic can be collected in a stable manner and the sample can accurately be purified.

[Construction of Strainer]

Figure 4:
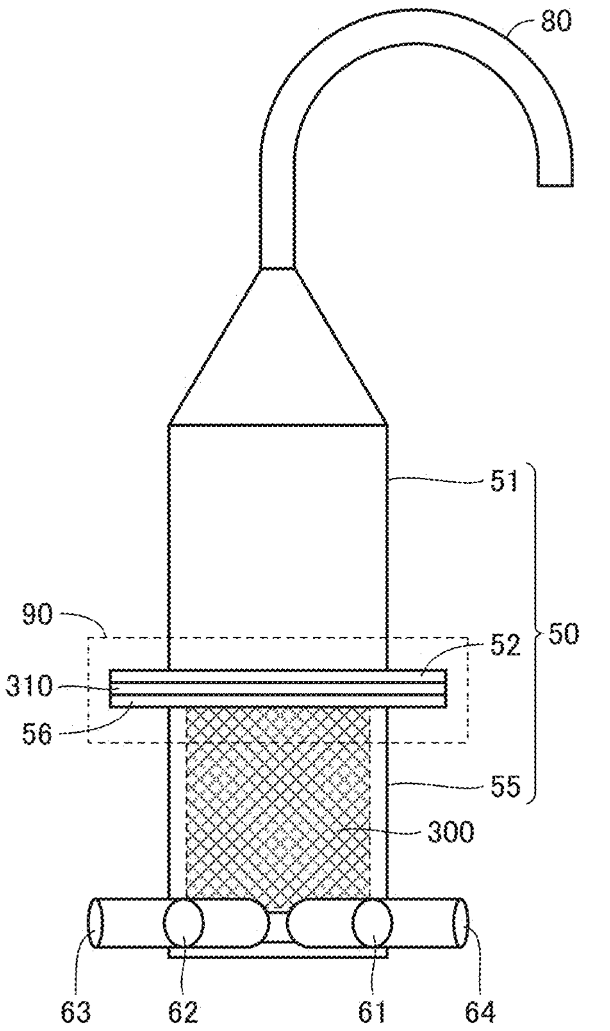
FIG. 4 is an external view of a container and a strainer included in the purification apparatus.
Figure 5:
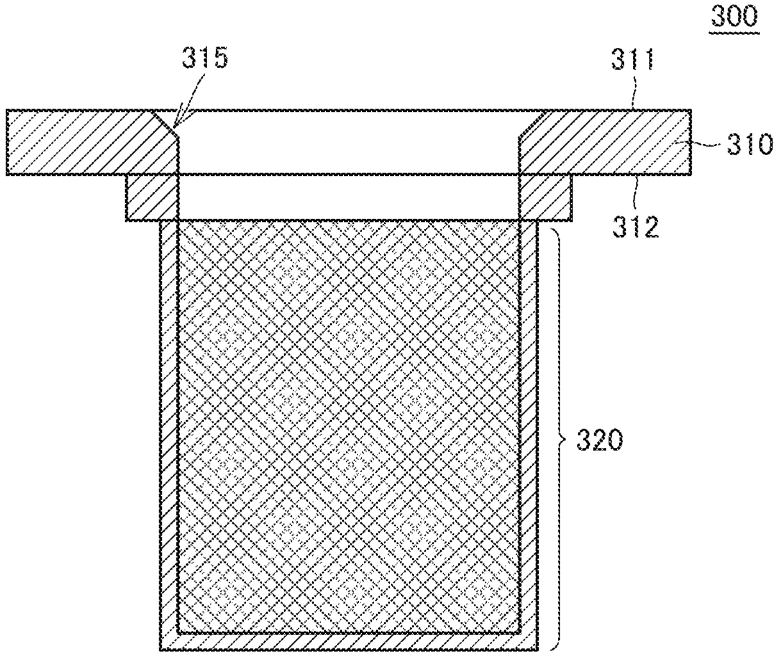
FIG. 5 is a lateral cross-sectional view of the strainer.

A construction of strainer 300 included in purification apparatus 1 in the present embodiment will now be described with reference to FIGS. 4 and 5. FIG. 4 is an external view of arrangement of strainer 300 in container 50 included in purification apparatus 1. FIG. 5 is a lateral cross-sectional view of strainer 300.

Referring to FIGS. 4 and 5, as described with reference to FIG. 1, container 50 includes first portion 51 on an upper side to which overflow portion 80 is connected and second portion 55 on a lower side where introduction ports 61 and 62 and discharge ports 63 and 64 are provided. Each of first portion 51 and second portion 55 is made of glass. Flange portions 52 and 56 are provided at a lower end of first portion 51 and an upper end of second portion 55, respectively.

As shown in FIG. 5, strainer 300 is generally in a form of a basket, and a flange portion 310 is provided at an upper end of a mesh portion 320 like a net substantially in a cylindrical shape. Mesh portion 320 of strainer 300 is arranged in the inside of second portion 55 of container 50. Flange portion 310 lies between flange portion 52 of first portion 51 and flange portion 56 of second portion 55. By clamping container 50 and the flange portion of strainer 300 with a fixing instrument 90 shown with a dashed line in FIG. 4, container 50 and strainer 300 are watertightly fixed to each other. In other words, leakage of the sample from a portion of contact between the container and the strainer can be prevented.

Strainer 300 is made of stainless steel (SUS), and mesh portion 320 is provided with a plurality of openings having a size small enough to catch microplastic which is the target substance. Specifically, mesh portion 320 has a mesh size equal to or more than 80 meshes. In other words, an opening of mesh portion 320 is equal to or smaller than 200 μm.

A distance long enough for arrangement of stirring bar 72 is set between a lower end of mesh portion 320 and a bottom surface of second portion 55 of container 50. Stirring bar 72 can thus smoothly rotate during decomposition treatment of the sample. By bringing a position of the lower end of mesh portion 320 as close as possible to the bottom surface of second portion 55, a space for accommodation of the sample in second portion 55 can be increased. Reaction in decomposition treatment can thus be promoted, and a separation distance between a substance to be collected and the contaminant in gravity separation can be secured.

In flange portion 310 of strainer 300, a first surface 311 in contact with flange portion 52 of first portion 51 of container 50 and a second surface 312 in contact with flange portion 56 of second portion 55 are sandblasted such that surface roughness thereof is equal to or more than prescribed roughness. With such surface treatment to a bearing surface of flange portion 310, wettability of the bearing surface can be enhanced, and hence adhesion of microplastic which is the target substance to the bearing surface can be prevented.

A corner portion 315 on an inner surface side of flange portion 310 is beveled. By beveling, the corner portion of the inner surface with which the sample comes in contact is at an obtuse angle, and hence adhesion of microplastic to the inner surface can be prevented.

Arrangement of such a strainer in the container can prevent leakage of the target substance in discharge of the waste solution from the container. Since an area where the target substance can be caught is larger than in an example where the filter is provided in the discharge port, clogging of the discharge port can be prevented and efficiency in discharge of the waste solution can be improved.

Aspects (Clause 1) A purification apparatus according to one aspect separates a target substance contained in a mixed sample based on a specific gravity difference. The purification apparatus includes a container that receives the mixed sample and a strainer arranged in the container. The container includes an introduction port to introduce a treatment solution for treatment of the mixed sample into the container and a discharge port to discharge the treatment solution from the container. The strainer is configured to catch the target substance in the treatment solution discharged through the discharge port and to hold the target substance in the container.

According to the purification apparatus according to Clause 1, since the strainer is arranged in the container, in discharge of the waste solution from the container through the discharge port, the target substance can be held in the container and leakage of the target substance to the outside of the container can be prevented.

(Clause 2) In the purification apparatus according to Clause 1, the treatment solution includes a heavy solution to separate the target substance. The container further includes a first portion and a second portion separable from each other and an overflow portion from which a supernatant produced by introduction of the heavy solution is discharged to the outside of the container, together with the target substance. The overflow portion is provided in the first portion. The introduction port and the discharge port are provided in the second portion. The strainer is arranged in the inside of the second portion.

According to the purification apparatus according to Clause 2, in the container, the strainer is arranged in the second portion where the introduction port and the discharge port are provided. Therefore, a space where the sample is accommodated in the second portion of the container can be increased, and furthermore, a separation distance between a substance to be collected and a contaminant in gravity separation can be secured.

(Clause 3) In the purification apparatus according to Clause 2, the strainer includes a flange portion lying between the first portion and the second portion. The strainer is fixed to the container at the flange portion.

According to the purification apparatus according to Clause 3, since the strainer is fixed at the flange portion by lying between the first portion and the second portion of the container, a position of the strainer relative to a container main body can be stabilized. Thus, the space where the stirring bar can rotate can be secured and reaction in decomposition treatment can be promoted. In addition, the separation distance between the substance to be collected and the contaminant in gravity separation can be secured.

(Clause 4) In the purification apparatus according to Clause 3, the strainer further includes a mesh portion connected to the flange portion, the mesh portion being configured to catch the target substance. A corner portion of an inner surface of the flange portion connected to the mesh portion is beveled.

According to the purification apparatus according to Clause 4, since the corner portion of the inner surface with which the sample comes in contact is at an obtuse angle, adhesion of microplastic to the inner surface can be prevented.

(Clause 5) In the purification apparatus according to Clause 4, the mesh portion has a mesh size equal to or more than 80 meshes.

According to the purification apparatus according to Clause 5, the strainer can reliably catch microplastic which is the target substance in discharge of the waste solution from the container.

(Clause 6) In the purification apparatus according to Clause 4, the mesh portion has an opening equal to or smaller than 200 μm.

According to the purification apparatus according to Clause 6, the strainer can reliably catch microplastic which is the target substance in discharge of the waste solution from the container.

(Clause 7) The purification apparatus according to any one of Clauses 3 to 6 further includes a fixing instrument that fixes the container and the strainer with the flange portion lying between the first portion and the second portion.

According to the purification apparatus according to Clause 7, the strainer is watertightly fixed to the container with the use of the fixing instrument so that leakage of the sample from a portion of contact between the container and the strainer can be prevented.

(Clause 8) In the purification apparatus according to any one of Clauses 2 to 7, the treatment solution further includes a decomposition solution that decomposes a contaminant contained in the mixed sample and a cleaning solution that cleans the mixed sample. The purification apparatus further includes a first reservoir where the decomposition solution is stored, a second reservoir where the heavy solution is stored, and a third reservoir where the cleaning solution is stored.

According to the purification apparatus according to Clause 8, reservoirs for individual storage of treatment solutions are provided. Therefore, each treatment solution can be supplied into the container in a stable manner.

(Clause 9) In the purification apparatus according to any one of Clauses 1 to 8, the target substance is microplastic.

According to the purification apparatus according to Clause 9, microplastic which is the target substance can be separated from the mixed sample.

It should be understood that the embodiment disclosed herein is illustrative and non-restrictive in every respect. The scope of the present invention is defined by the terms of the claims rather than the description of the embodiment above and is intended to include any modifications within the scope and meaning equivalent to the terms of the claims.

REFERENCE SIGNS LIST

1 purification apparatus; 11 to 23 pipe; 31, 32 introduction pump; 33 discharge pump; 41, 42, 43 electromagnetic valve; 50 container; 51 first portion; 52, 56, 310 flange portion; 55 second portion; 59 discharge outlet; 61, 62 introduction port; 63, 64 discharge port; 71 stirrer; 72 stirring bar; 80 overflow portion; 90 fixing instrument; 100 purification instrument; 110 decomposition solution reservoir; 120 heavy solution reservoir; 130 rinse solution reservoir; 140, 150 waste solution reservoir; 210 detection filter; 215 supernatant reservoir; 300 strainer; 311 first surface; 312 second surface; 315 corner portion; 320 mesh portion; 500 controller; 501 computing device; 502 memory; 503 communication device; 504 display; 505 input device; 506 data reading device; 507 storage medium; 510 storage; 511 control program; 512 control data.

The invention claimed is:

1. A purification apparatus that separates a target substance contained in a mixed sample based on a specific gravity difference, the purification apparatus comprising:
- a container that receives the mixed sample; and
- a strainer arranged in the container, wherein
- the container includes
  - an introduction port to introduce a treatment solution for treatment of the mixed sample into the container,
  - a discharge port to discharge the treatment solution from the container, and
  - a first portion and a second portion separable from each other,
- the strainer includes a flange portion provided at an upper end of the strainer,
- the strainer is fixed inside of the second portion with the flange portion sandwiched between the first portion and the second portion, and
- the strainer is configured to catch the target substance in the treatment solution discharged through the discharge port and to hold the target substance in the container.

2. The purification apparatus according to claim 1, wherein
- the treatment solution includes a heavy solution to separate the target substance,
- the container further includes an overflow portion from which a supernatant produced by introduction of the heavy solution is discharged to outside of the container, together with the target substance,
- the overflow portion is provided in the first portion, and
- the introduction port and the discharge port are provided in the second portion.

3. The purification apparatus according to claim 1, wherein
- the strainer further includes a mesh portion connected to the flange portion, the mesh portion being configured to catch the target substance, and
- a corner portion of an inner surface of the flange portion connected to the mesh portion is beveled.

4. The purification apparatus according to claim 3, wherein
- the mesh portion has a mesh size equal to or more than 80 meshes.

5. The purification apparatus according to claim 3, wherein
- the mesh portion has an opening equal to or smaller than 200 μm.

6. The purification apparatus according to claim 1, further comprising a fixing instrument that fixes the container and the strainer with the flange portion lying between the first portion and the second portion.

7. The purification apparatus according to claim 1, wherein
- the treatment solution further includes
  - a decomposition solution that decomposes a contaminant contained in the mixed sample, and
  - a cleaning solution that cleans the mixed sample, and
- the purification apparatus further comprises:
- a first reservoir where the decomposition solution is stored;
- a second reservoir where the heavy solution is stored; and
- a third reservoir where the cleaning solution is stored.

8. The purification apparatus according to claim 1, wherein the target substance is microplastic.

9. A purification apparatus that separates a target substance contained in a mixed sample based on a specific gravity difference, the purification apparatus comprising:

a container that receives the mixed sample; and a strainer arranged in the container, wherein the container includes an introduction port to introduce a treatment solution for treatment of the mixed sample into the container, and a discharge port to discharge the treatment solution from the container, the strainer is configured to catch the target substance in the treatment solution discharged through the discharge port and to hold the target substance in the container, the treatment solution further includes a decomposition solution that decomposes a contaminant contained in the mixed sample, a heavy solution to separate the target substance, and a cleaning solution that cleans the mixed sample, and the purification apparatus further comprises:

a first reservoir where the decomposition solution is stored;

a second reservoir where the heavy solution is stored; and a third reservoir where the cleaning solution is stored.

* * * * *